United States Patent [19]

Ochi et al.

[11] Patent Number: 4,727,980
[45] Date of Patent: Mar. 1, 1988

[54] APPARATUS FOR CONVEYING THE MATERIAL TO BE SEWN

[75] Inventors: Moriya Ochi; Masahiro Sahashi, both of Toyota, Japan

[73] Assignee: Aisin Seiki Kabushiki Kaisha, Kariya, Japan

[21] Appl. No.: 29,960

[22] Filed: Mar. 25, 1987

[30] Foreign Application Priority Data

Mar. 25, 1986 [JP] Japan .................................. 61-64787

[51] Int. Cl.$^4$ ............................................. B65G 21/14
[52] U.S. Cl. .................................... 198/812; 198/817; 112/121.15; 112/304
[58] Field of Search ................................. 198/812–817, 198/803.2, 586, 588, 594–596, 644; 271/175, 198, 264; 112/121.11, 121.12, 121.15, 121.29, 304

[56] References Cited

U.S. PATENT DOCUMENTS

| | | | |
|---|---|---|---|
| 2,796,167 | 6/1957 | Thompson | 198/812 |
| 2,868,413 | 1/1959 | Vossen | 198/817 X |
| 3,283,882 | 11/1966 | Conrad | 198/817 |
| 3,917,505 | 11/1975 | Schulze | 198/817 X |
| 3,952,861 | 4/1976 | Holmquist et al. | 198/817 X |
| 4,428,315 | 1/1984 | Keeton | 112/121.29 X |

Primary Examiner—Frank E. Werner
Assistant Examiner—Lyle K. Kimms
Attorney, Agent, or Firm—Oblon, Fisher, Spivak, McClelland & Maier

[57] ABSTRACT

An apparatus for conveying an article, as during a sewing operation, includes a pair of driving pulleys supported on a first support simultaneously rotatably by an electric motor and spaced apart from each other transversely of the apparatus and a pair of driven pulleys supported simultaneously rotatably on a second support and spaced apart from each other transversely of the apparatus. A pair of first fixed intermediate pulleys and a pair of first movable intermediate pulleys are supported simultaneously rotatably on the first support below the driving pulleys and between the driving pulleys and the fixed intermediate pulleys, respectively. The second support is spaced apart from the first support longitudinally of the apparatus and the first and second supports are horizontally movable to and away from each other. A pair of second fixed intermediate pulleys and a pair of second movable intermediate pulleys are supported simultaneously rotatably on the second support below the driven pulleys and between the driven pulleys and the second fixed intermediate pulleys. The first and second movable intermediate pulleys are horizontally movable to and away from each other. The two pulleys of which each pair of intermediate pulleys consists are spaced apart from each other transversely of the apparatus. A pair of endless conveyor belts are spaced apart from each other transversely of the apparatus and are each wound around one of the driving pulleys, one of the driven pulleys and one pulley of each pair of intermediate pulleys. Each belt has an effective conveyor portion travelling horizontally from one of the driven pulleys to one of the driving pulleys upon rotation of the motor.

7 Claims, 5 Drawing Figures

APPARATUS FOR CONVEYING THE MATERIAL TO BE SEWN

BACKGROUND OF THE INVENTION

1. Field of the Invention

This invention relates to an apparatus for conveying the material to be sewn automatically from one step of a sewing operation to another.

2. Description of the Prior Art

A known apparatus for conveying the material to be sewn from one step of a sewing operation to another is shown by way of example in FIG. 1. It includes a first support A having at its top a box B in which a motor C is mounted. The box B also contains a driving pulley connected to the output of the motor C. A second support D is spaced apart from the first support A and has at its top a plate E by which a driven pulley F is rotatably supported. An endless conveyor belt G extends between the driving pulley and the driven pulley F and is movable in a direction shown by arrows if the motor C is driven. The second support D is provided in an area in which a particular step of the sewing operation is carried out, and the first support A in a different area in which the immediately following step of the operation is performed. If the material H to be sewn is placed on the endless belt G by a person working at the second support D, its weight bears upon the belt G and produces therebetween a frictional force which enables the material H to move with the belt G from the second support D to the first support A without slipping. A sensor I is provided on the box B and the material H contacts the sensor I upon arriving at the first support A. As soon as the material H contacts the sensor I, the operation of the motor C is stopped and the movement of the belt G is, therefore, discontinued. As soon as the material H is removed from the belt G by a person working at the first support A, the sensor I returns to its original position and the motor C is, therefore, driven again to resume the movement of the belt G for conveying another material to be sewn.

The apparatus as hereinabove described is suitable for conveying a flexible and relatively light material, but is difficult to employ for conveying a stiff and heavy material, such as a thick sheet of cloth, artificial leather or a mat, which is difficult to place on, or suspend from, the belt. It is unusable if the material to be sewn is, for example, a sheet of a stiff and inflexible material.

The apparatus also has the disadvantage of having a fixed distance between the first and second supports A and D. If the distance is not suitable for the use of the apparatus between any two steps of the sewing operation, it is necessary to change the belt G to a different one, or cut off a portion of the belt or add to its length so that the two supports A and D may be positioned at an appropriate distance from each other.

SUMMARY OF THE INVENTION

It is, therefore, an object of this invention to provide an improved apparatus which can easily convey various kinds of materials to be sewn, including not only a light and flexible material, but also a heavy, stiff or inflexible material or a material having a complicated shape, and which has an easily adjustable effective belt length extending between two areas where two successive steps of a sewing operation are performed.

This object is attained by an apparatus which essentially comprises a first support, a pair of driving pulleys supported by the first support, a second support which is spaced apart from the first support longitudinally of the apparatus, a pair of driven pulleys supported by the second support, a pair of intermediate pulleys supported by the first support, a pair of movable intermediate pulleys supported by the second support, the two pairs of intermediate pulleys being movable to or away from each other, a pair of endless conveyor belts extending in parallel to each other and spaced apart from each other transversely of the apparatus, a pair of fixed intermediately pulleys supported by the first support and a pair of fixed intermediate pulleys supported by the second support, one of the belts being wound around one of the driving pulleys, one of the driven pulleys and one pulley of each pair of movable and fixed intermediate pulleys, while the other belt is wound around the other driving pulley, the other driven pulley and the other pulley of each pair of movable and fixed intermediate pulleys, each pair of movable intermediate pulleys being so located relative to the belts as to form an adjusting loop in each belt and thereby adjust the effective belt length between the first and second supports.

The two driving pulleys can be driven by a single motor to drive the two belts at the same speed. If the material to ve conveyed is flexible and relatively light in weight, it can be suspended from one of the belts. On the other hand, a stiff, inflexible and heavy material can be placed on the two belts.

The use of two spaced apart belts instead of a single wide belt has the advantage that the belts remain so elastic as to adapt themselves to any material having a complicated shape or an uneven thickness and can be driven more efficiently. Moreover, the two belts have a total weight which is by far smaller than the weight of a single wide belt and are, therefore, less expensive.

If the first and second supports are moved to or away from each other, while the two pairs of movable intermediate pulleys are likewise moved to or away from each other, it is easily possible to adjust the effective belt length without changing the belts per se or their original length and thereby adapt the apparatus to any variation in the nature of the material to be conveyed or a different layout of a sewing plant. In this connection, it is advantageous to connect the first and second supports by a telescopic device which cooperates with the movable intermediate pulleys to facilitate the adjustment of the effective belt length to a further extent.

Other features and advantages of this invention will be apparent from the following detailed description and the accompanying drawings.

BRIEF DESCRIPTION OF THE DRAWINGS

FIG. 5 is a diagram showing an electrical circuit for the apparatus of FIG. 2.

DETAILED DESCRIPTION OF THE INVENTION

Figure 1:
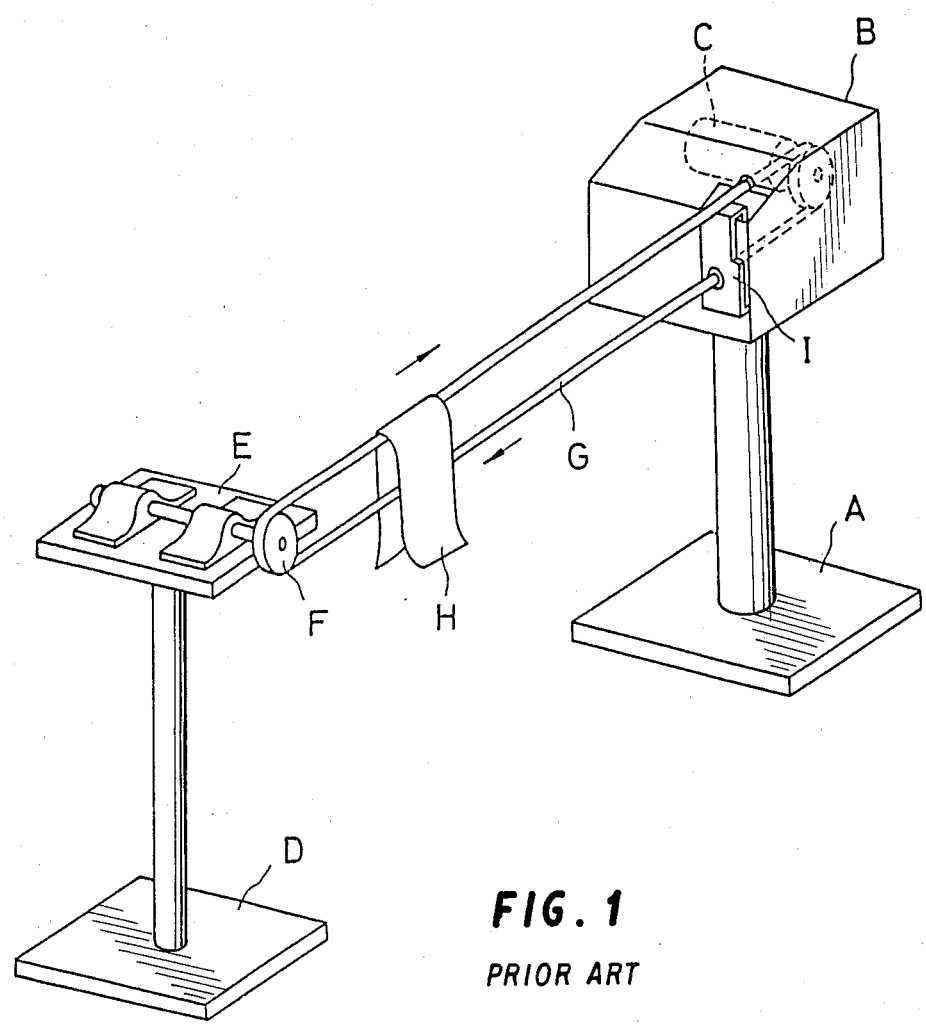
FIG. 1 is a perspective view of the apparatus known in the art as hereinbefore described.
Figure 2:
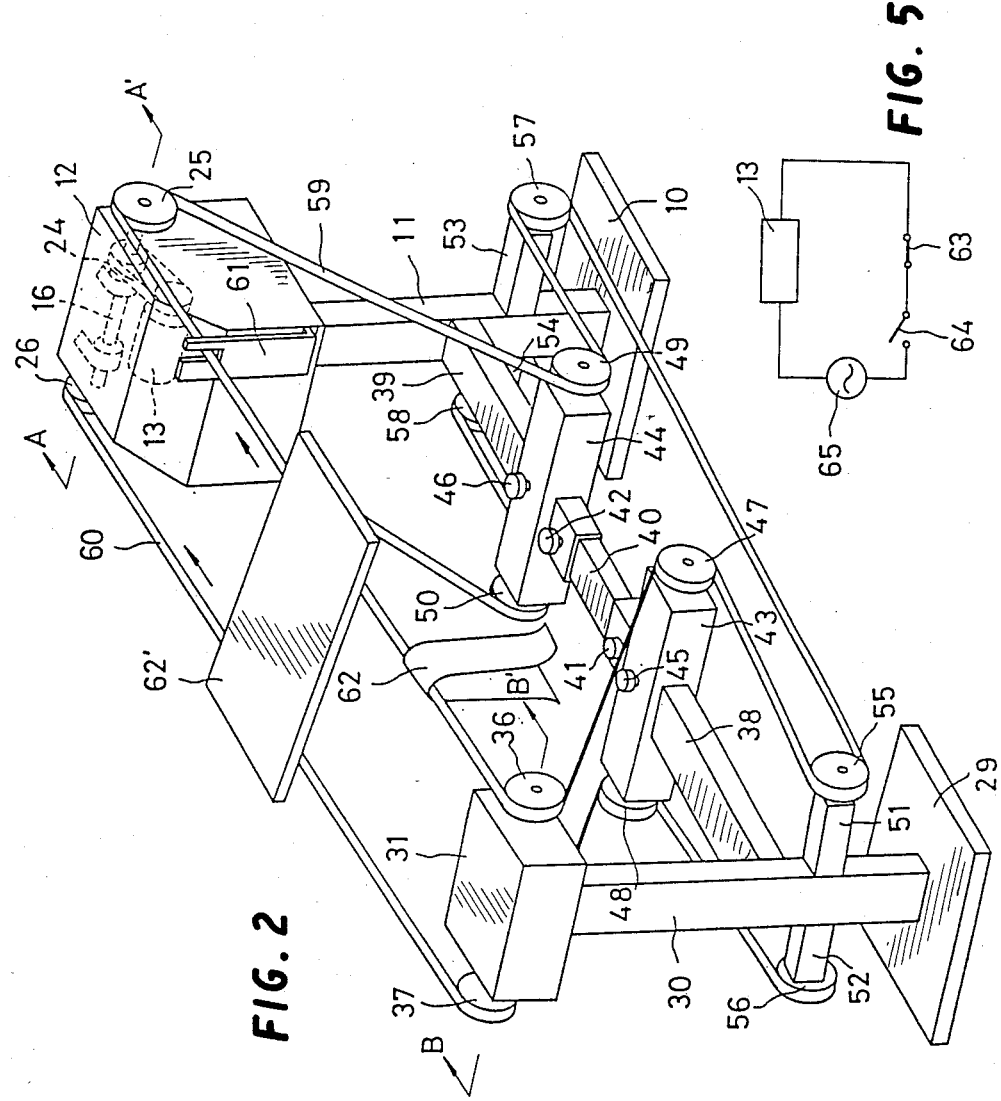
FIG. 2 is a perspective view of an apparatus embodying this invention.
Figure 3:
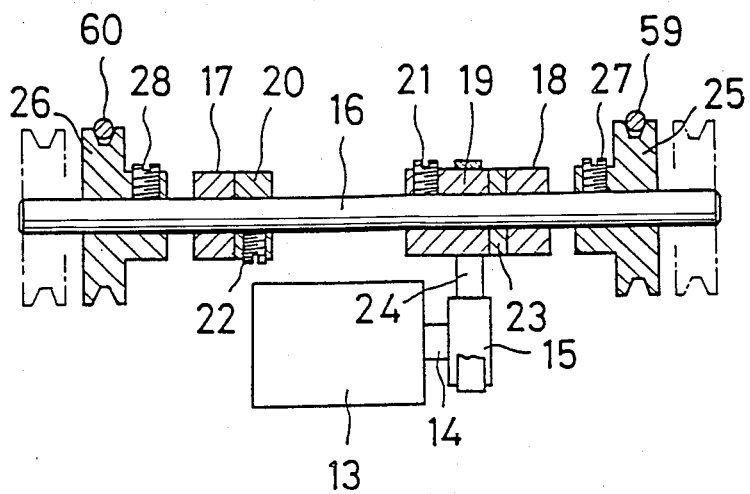
FIG. 3 is an enlarged sectional view taken along the line A—A' of FIG. 2.
Figure 4:
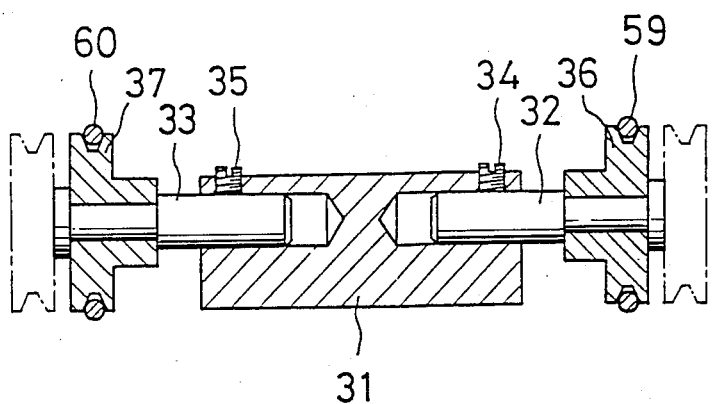
FIG. 4 is an enlarged sectional view taken along the line B—B' of FIG. 2.

An apparatus embodying this invention is shown by way of example in FIGS. 2 to 4. It includes a first support which is generally shown at 10. The first support includes an upstanding first prop 11 having an upper end on which a box 12 is supported. An electric motor 13 is mounted in the box 12 by an appropriate bracket not shown and has an output shaft 14 on which a first timing pulley 15 is rotatably supported.

A drive shaft 16 extends transversely of the apparatus and is rotatably supported by a pair of transversely spaced apart bearings 17 and 18 secured to the box 12. A second timing pulley 19 and a collar 20 are secured to the shaft 16 between the bearings 17 and 18 by screws 21 and 22, respectively. A spacer 23 having an appropriate thickness is fitted between the bearing 18 and the second timing pulley 19 to hold the shaft 16 against axial movement transversely of the apparatus.

A timing belt 24 is wound around the first and second timing pulleys 15 and 19 to transmit the rotation of the motor 13 to the drive shaft 16. A pair of driving pulleys 25 and 26 are secured to the drive shaft 16 adjacent to its opposite ends, respectively, by screws 27 and 28, respectively.

A second support is generally shown at 29 and is spaced apart from the first support 10 longitudinally of the apparatus. The second support 29 includes an upstanding second prop 30 having an upper end on which a bearing body 31 is mounted. The bearing body 31 has a pair of coaxial bearing ports which extend transversely of the apparatus, and in which a pair of pulley shafts 32 and 33 are slidably fitted. The pulley shafts 32 and 33 are secured to the bearing body 31 by screws 34 and 35, respectively.

A pair of transversely spaced apart driven pulleys 36 and 37 are rotatably supported on the outer ends of the pulley shafts 32 and 33, respectively. The pulleys 36 and 37 are rotatable independently of the pulley shafts 32 and 33, respectively. Each of the shafts 32 and 33 has a flange at its outer end and a shoulder spaced inwardly from the flange for receiving the corresponding driven pulley therebetween and preventing its transverse displacement along the pulley shaft. The driven pulleys 36 and 37 have therebetween a distance which is equal to that between the driving pulleys 25 and 26.

A pair of hollow beams 38 and 39 each having a rectangular cross section extend horizontally toward each other and longitudinally of the apparatus. The beam 39 has one end joined to the prop 11 of the first support 10 and the beam 38 has one end joined to the prop 30 of the second support 29. The other ends of the beams 38 and 39 are open and face each other in a coaxial relation. A horizontal connecting rod 40 having a rectangular cross section has a pair of end portions fitted slidably into the beams 38 and 39, respectively. A pair of first adjusting screws 41 and 42, which are spaced apart from each other longitudinally of the apparatus, secure the beams 38 and 39 to the connecting rod 40 and thereby hold them in a particular positional relation to each other.

A pair of intermediate pulley supports 43 and 44 extend horizontally in parallel to each other transversely of the apparatus and are spaced apart from each other longitudinally of the apparatus. The supports 43 and 44 are supported on the beams 38 and 39, respectively, slidably longitudinally of the apparatus to or away from each other. A pair of second adjusting screws 45 and 46, which are spaced apart from each other longitudinally of the apparatus, secure the supports 43 and 44 to the beams 38 and 39, respectively, and thereby hold them in a particular positional relation to each other.

A pair of intermediate pulleys 47 and 48 are rotatably supported on the opposite ends, respectively, of the support 43 and are spaced apart from each other transversely of the apparatus. Likewise, a pair of intermediate pulleys 49 and 50 are rotatably supported on the opposite ends, respectively, of the support 44 and are spaced apart from each other transversely. The distance between the pulleys 47 and 48 and the distance between the pulleys 49 and 50 are equal to the distance between the driving pulleys 25 and 26 or between the driven pulleys 36 and 37. The two pairs of intermediate pulleys are movable to or away from each other insofar as they are supported on the slidable supports 43 and 44, respectively.

A pair of horizontally aligned arms 53 and 54 project from a pair of opposite sides of the prop 11 and extend transversely of the apparatus. A pair of intermediate pulleys 57 and 58 are rotatably supported on the free ends of the arms 53 and 54, respectively. Likewise, a pair of horizontally aligned arms 51 and 52 project from the prop 30 and extend transversely of the apparatus. A pair of intermediate pulleys 55 and 56 are rotatably supported on the free ends of the arms 51 and 52, respectively. The pulleys 55 and 56, as well as the pulleys 57 and 58, are spaced apart from each other transversely of the apparatus by a distance which is equal to the distance between the driving pulleys 25 and 26, or between the driven pulleys 36 and 37.

An endless conveyor belt 59 is wound around the driving pulley 25, the intermediate pulleys 49, 57, 55 and 47 and the driven pulley 36. Likewise, another conveyor belt 60 is wound around the driving pulley 26, the intermediate pulleys 50, 58, 56 and 48 and the driven pulley 37.

A sensor plate 61 is vertically disposed in a path along which the endless belt 59 is movable, and has a lower end supported rotatably on that side of the box 12 which faces the bearing body 31. The sensor plate 61 is normally held in its upstanding position by a small elastic force, as shown in FIG. 2. If the material 62 to be sewn which has been conveyed by the belt 59, as will hereinafter be described in further detail, contacts the sensor plate 61, it is pushed by the material 62 to a rotated position, as the frictional force between the belt 59 and the material 62 overcomes the elastic force of the sensor plate 61. As soon as the sensor plate 61 is rotated, a normally closed microswitch 63 (FIG. 5) is turned off. As soon as the material 62 is removed from the belt 59, the sensor plate 61 returns to its upright position elastically and the microswitch 63 is turned on again.

The motor 13 forms a serial circuit with the microswitch 63, a normally open main switch 64 and a power source 65, as shown in FIG. 5. It is usually sufficient to close the main switch 64 in order to drive the conveyor belts.

The apparatus which has hereinabove been described can be installed between any two steps of a sewing operation, for example, between a sewing apparatus and a cutting apparatus.

If the main switch 64 is closed, the motor 13 is placed in operation and its rotation is transmitted to the endless belts 59 and 60 through the drive shaft 16 and the driving pulleys 25 and 26. The belts 59 and 60 are moved around the driving, driven and intermediate pulleys and the effective portions of the belts, on which the material to be conveyed is placed, are moved from the second support 29 to the first support 10 as shown by two arrows in FIG. 2.

A relatively stiff and elongated material or sewn product 62', such as of a thick sheet of cloth or artificial leather, can be placed over the two belts 59 and 60, as shown in FIG. 2. As the rotation of the motor 13 is transmitted to the belts 59 and 60 through the timing belt 24, they are moved at the same speed and the material 62' is, therefore, conveyed without displacing itself or falling from the belts. As soon as the material 62' contacts the sensor plate 61, the sensor plate 61 is rotated and the microswitch 63 is turned off to stop the rotation of the motor 13 and thereby the movement of the belts 59 and 60. As soon as the material 62' is removed from the belts 59 and 60, the sensor plate 61 is allowed to return to its upright position and the microswitch 63 is turned on to enable the movement of the belts 59 and 60 again.

If the material to be conveyed is a relatively flexible one, only the belt 59 is used for conveying it as shown at 62 in FIG. 2.

If the overall length of the apparatus is smaller than the distance between any two stations where two successive steps of a sewing operation are going to be carried out, it is possible to increase the distance between the first and second supports 10 and 29 and thereby the overall length of the apparatus so that nobody working in either of the two stations may be required to move unnecessarily for placing the material to be conveyed on the belt or belts, or removing it therefrom.

This adjustment can be easily made if the adjusting screws 41, 42, 45 and 46 are loosened, and if the beams 38 and 39 are moved away from each other so that the first and second supports 10 and 29 may have a desired distance therebetween. If the supports 10 and 29 are moved away from each other, the intermediate pulley supports 43 and 44 are also moved away from each other by virtue of the tension of the belts 59 and 60. The screws 41, 42, 45 and 46 are tightened again after it has been ascertained that the belts 59 and 60 are held under proper tension. If the tension of the belts 59 and 60 is not sufficient for moving the intermediate pulley supports 43 and 44 away from each other by a desired distance, they are moved away manually and the tension of the belts is, then, adjusted properly.

If it is necessary to increase the overall length of the apparatus only to a small extent, it is sufficient to move only one of the first and second supports 10 and 29. If, on the other hand, the overall length of the apparatus is larger than the distance between any two stations, it can also be adjusted easily if the supports 10 and 29 are moved toward each other.

According to another important aspect of this invention, it is possible to alter the distance between the two belts 59 and 60. For example, the distance between the belts 59 and 60 can be increased to ensure the safe and reliable transportation of a stiff, inflexible and elongated material. For this purpose, the screws 27, 28, 34 and 35 holding the driving pulleys 25 and 26 and the pulley shafts 32 and 33, respectively, are loosened and the driving pulleys 25 and 26, as well as the driven pulleys 36 and 37, are moved away from each other until a desired distance is obtained between the belts 59 and 60, as shown in FIGS. 3 and 4. Then, the screws 27, 28, 34 and 35 are tightened again. Of course, it is also necessary to adjust the distances between the intermediate pulleys 47 and 48, 49 and 50, 55 and 56, and 57 and 58. This adjustment is not described in detail or shown in the drawings, but is easily possible if the intermediate pulleys are also supported in a way which is similar to what is shown in FIG. 3 or 4.

The term "longitudinally" as used herein and in the appended claims refers to the direction in which the conveyor belts travel or the material to be conveyed is moved on the belt or belts, or which suggests the overall length of the apparatus, while the term "transversely" refers to the direction which is perpendicular to the "longitudinal" direction.

What is claimed is:

1. An apparatus for conveying an article which comprises:
   a first support;
   a pair of driving pulleys supported on said first support rotatably simultaneously by an electric motor, said pulleys being spaced apart from each other transversely of the apparatus;
   a pair of first fixed intermediate pulleys supported rotatably simultaneously on said first support below said driving pulleys;
   a pair of first movable intermediate pulleys supported rotatably simultaneously on said first support between said driving pulleys and said fixed intermediate pulleys;
   a second support spaced apart from said first support longitudinally of the apparatus, said first and second supports being horizontally movable to and away from each other;
   a pair of driven pulleys supported rotatably simultaneously on said second support and spaced apart from each other transversely of the apparatus;
   a pair of second fixed intermediate pulleys supported rotatably simultaneously on said second support below said driven pulleys;
   a pair of second movable intermediate pulleys supported rotatably simultaneously on said second support between said driven pulleys and said second fixed intermediate pulleys, said first and second movable intermediate pulleys being horizontally movable to and away from each other, each of said pairs of intermediate pulleys being spaced apart from each other transversely of the apparatus; and
   a pair of endless conveyor belts spaced apart from each other transversely of the apparatus and each wound around one of said driving pulleys, one of said driven pulleys and one pulley of each of said pairs of intermediate pulleys, each of said belts having an effective conveyor portion travelling horizontally from one of said driven pulleys to one of said driving pulleys upon operation of said motor.

2. An apparatus as set forth in claim 1, further including a telescopic device connecting said first and second supports movably to and away from each other and supporting thereon said first and second movable intermediate pulleys movably to and away from each other.

3. An apparatus as set forth in claim 2, wherein said telescopic device comprises a pair of longitudinally aligned hollow beams extending horizontally from said first and second supports, respectively, and a connecting member extending horizontally between said beams and having a pair of ends fitted into said beams, respectively, said beams being slidable along said connecting member to and away from each other, said first movable intermediate pulleys being supported on one of said beams and said second movable intermediate pulleys on the other.

4. An apparatus as set forth in claim 3, further including a pair of movable pulley supporting members supported slidably on said beams, respectively, said first movable intermediate pulleys being supported on one of said pulley supporting members and said second movable intermediate pulleys on the other.

5. An apparatus as set forth in claim 4, wherein the two pulleys of which each of said pairs of pulleys consists have a variable distance therebetween.

6. An apparatus as set forth in any of claims 1 to 5, further including a sensor provided on said first support and adapted for actuation by an article carried on at least one of said belts to break an electric circuit associated with said motor and thereby stop the movement of said belts.

7. An apparatus as set forth in claim 6, wherein said article is a material to be sewn or a sewn product.

* * * * *